Nov. 10, 1931.　　　　　C. R. MacDONALD　　　　　1,831,779
METHOD AND APPARATUS FOR RECLAIMING WASTE ROOFING MATERIAL
Original Filed Nov. 5, 1925
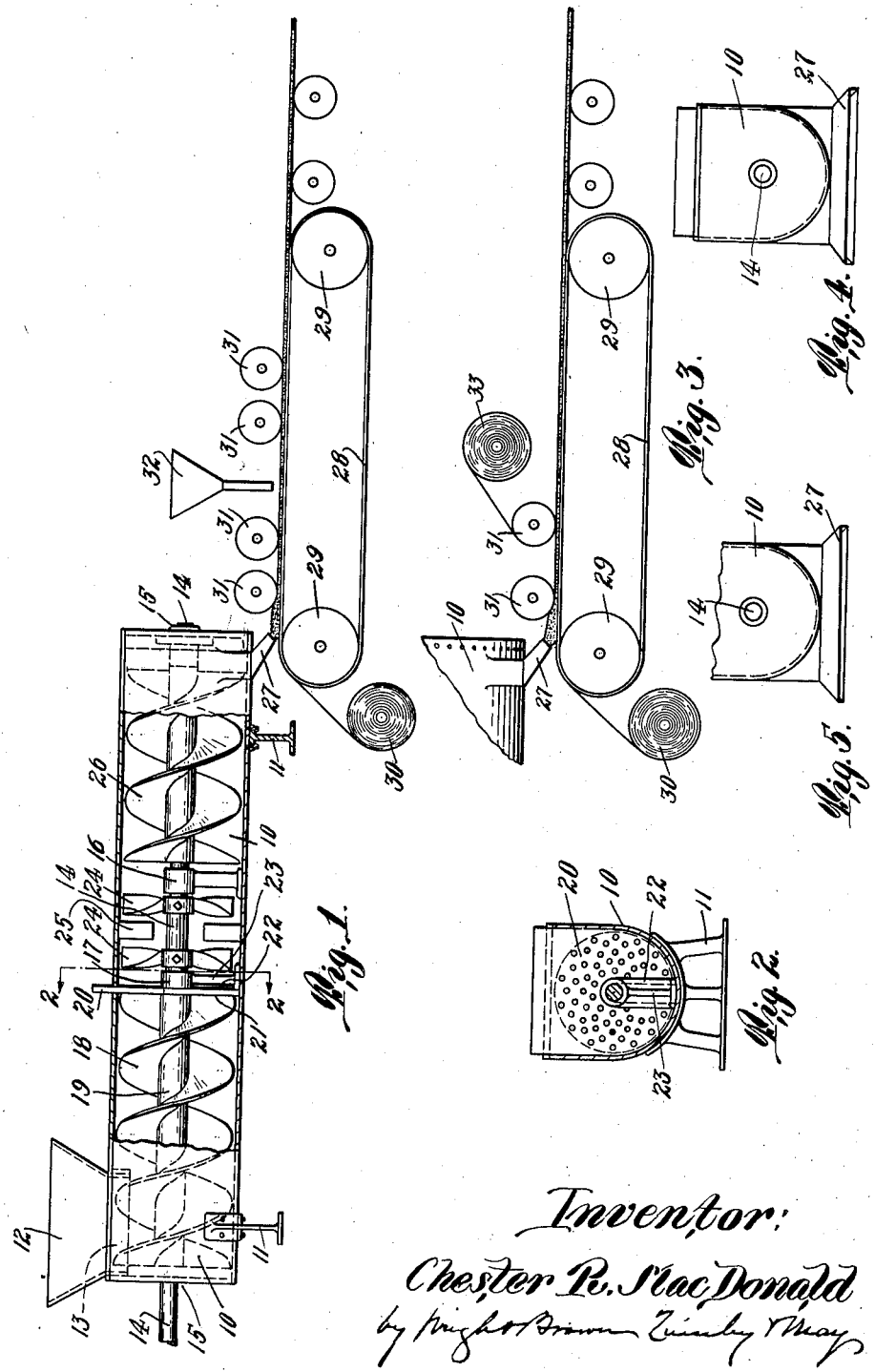
Inventor:
Chester R. MacDonald
by Wright, Brown, Quinby & May
Att'ys.

Patented Nov. 10, 1931

1,831,779

UNITED STATES PATENT OFFICE

CHESTER R. MacDONALD, OF PASSAIC, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

METHOD AND APPARATUS FOR RECLAIMING WASTE ROOFING MATERIAL

Application filed November 5, 1925, Serial No. 66,974. Renewed August 29, 1929.

The invention relates to apparatus for reclaiming scraps of material from manufactured roofing, especially the type of material made by impregnating or coating fibrous material with a bituminous compound, with or without the further addition of a layer of grit.

An object of the invention is to break down the various constituents of the scraps of material by the application of heat and a cutting process but without the addition of any water or other substance tending to separate the constituents of the scraps, then after a thorough mixing to intermingle the constituents into a plastic mass to form the mass into any desirable shapes for the production of a wide variety of articles. Owing to the matting or felting of the fibrous material used in the manufacture of most roofing material, such material requires severe treatment to disintegrate the pieces thoroughly. The presence of grit as commonly used on such roofing complicates the problem of dealing with the matted or felted fibrous material, since cutting edges are quickly worn away and are therefore impracticable. By my machine all these materials are successfully handled and the scraps are reduced to a plastic mass. A mass of such material may be readily formed into sheets or other shapes for a variety of purposes and uses. It is particularly suitable for flooring, wall-boards, roofing elements, and for similar uses.

Various further advantages will appear from the drawings, in which,—

Figure 1 is a side elevation of the apparatus, part of the mixing drum being broken away.

Figure 2 is a section taken on the line 2—2 of Figure 1.

Figure 3 is an elevation of another arrangement of apparatus for treating the plastic material extended from the mixer.

Figures 4 and 5 are typical forms of orifices through which the plastic material is extruded after being mixed.

Referring to the drawings in detail, 10 represents a metal drum preferably of cylindrical form, supported by suitable standards 11, with its axis horizontal. A hopper 12 may be secured in an opening 13 at one end of the drum 10 for the introduction of scraps of manufactured roofing material into the drum. A bearing shaft 14 extends through the drum axially thereof and is supported in suitable end bearings, as at 15, and also by the bearings 16 and 17 situated near the central portion of the drum. A screw conveyor 18, preferably having a hollow hub member 19, is mounted on the bearing shaft 14 in the receiving end portion of the drum 10. This screw conveyor is of a size to fit closely within the drum and serves to feed the scraps of material from the hopper to a perforated plate 20.

Where the material acted on includes bituminous or similar thermoplastic constituents, the drum is preferably heated by any suitable means to render the material soft and plastic so that the constituents may be thoroughly broken down and mixed. This heat may be supplied in any convenient way, such, for example, as a steam coil or jacket surrounding the drum, or a flame applied directly to the outer surface of the drum, or by passing steam into the hollow hubs of the screw conveyors, or by any combination of these methods. When sufficient heat is supplied to liquefy the thermoplastic constituents, the apparatus is capable of reducing scrap roofing material of the slate-covered, asphalt-impregnated felt type to a homogeneous non-aqueous mass consisting of a mixture in which substantially all the original constituents of the scraps are evenly distributed.

The perforations in the plate 20 may be of any preferred size, it being found that one-quarter inch diameter is suitable for ordinary roofing material. The edges 21 on the ends of the screw conveyor which abut the plate 20 may be sharpened or provided with cutting knives to assist in the process of breaking down the materials of the scrap. The motion of the conveyor kneads the material and presses it against the plate 20 and forces it through the perforations so that it emerges on the opposite side in the form of soft rods. This plate 20 is preferably made removable by providing a slot to receive the shaft 14 so that replacements may be readily made. This permits the use of plates with perforations of different sizes which may be selected from according to the kind of roofing material operated on. The slot is covered by a fin 22 formed on the standard 23 which supports the bearing 17.

As the rods of material emerge from the perforations in the plate 20, they are chopped up and thoroughly mixed by the blades 24, which are fixed on the shaft 14 to rotate therewith. There may be as many sets of blades 24 as desired, two being illustrated in the drawings. The material is thus subjected to a succession of disintegrating operations and is agitated and mixed while undergoing such operations. Cooperating with the rotating blades and positioned therebetween are stator blades 25 which may be secured to the shell of the drum 10. As will readily be seen, the forcing of the material through the perforations tends to shred the felted fibrous constituents and to arrange the shreds lengthwise in the rods which are extruded from the plate. The revolving blades chop across these soft shreds and cut or tear them in small bits, thus securing an even consistency of material. The rotating and stationary blades also effect a thorough mixing of the materials and pass them on to a second screw conveyor 26 which extends therefrom toward the discharge end of the drum 10. At the discharge end is located a delivery nozzle 27, through which the material may be forced by the screw conveyor 26. This delivery nozzle may be shaped to deliver the material in a continuous strip of any preferred cross section, two forms of the nozzle being illustrated in Figures 4 and 5. The form shown in Figure 4 is designed to deliver a strip of material of rectangular transverse section, that in Figure 5 being designed to deliver a strip with tapered transverse section. If desired, nozzles may be designed to deliver a strip of circular, square or any other shape of cross section.

When the strip of material emerges from the nozzle 27, it can be given any further treatment desired. As shown in the drawings, an endless conveyor belt 28 is suitably mounted on pulleys 29 to carry the strip away from the discharge nozzle. A roll of paper 30 may be supplied, from which a strip of paper is led over the belt 28 to receive a layer of the material from the nozzle and to be combined therewith. Suitable rollers 31 may also be provided for further treatment of the material, and a hopper 32 may be used to supply a coating of grit if desired. As shown in Figure 3, a second roll of paper 33 may be supplied in such a position as to engage the upper surface of the strip, thus producing a product in the form of a board with paper on both sides. These two arrangements of apparatus for further treatment of the material strip are merely illustrative of many possible varieties of apparatus for producing various kinds of finished products from such material.

My invention is not to be limited to the particular device shown and described herein, which is subject to such modifications and changes as fall within the scope of the appended claims.

I claim:

1. The process of reclaiming scraps of bitumen-impregnated fibrous material comprising softening the scraps by heat, shredding the fibrous constituents, arranging the shreds lengthwise in the same direction, chopping across the shreds, and mixing the chopped bits.

2. The process of reclaiming scraps of bitumen-impregnated fibrous material, comprising softening the scraps by heat, shredding the fibrous constituents, arranging the shreds lengthwise in the same direction, then thoroughly mixing the shredded mass.

3. The process of reclaiming scraps of manufactured roofing material comprising mixing the scraps into a plastic mass with the application of heat, extruding the mass in the form of small rods, chopping up the rods and intermixing the chopped up material, extruding the material so treated in a sheet of any desired cross section, and rolling out the sheet.

4. In apparatus for reclaiming scraps of manufactured roofing material, a mixing drum, a perforated partition positioned transversely within the drum, means for applying heat to the drum, means for forcing the material through said perforated partition, means for mixing the material forced through the perforations, a delivery nozzle having an aperture of predetermined cross section, and means for forcing the mixed material through said aperture.

5. In apparatus for reclaiming scraps of manufactured material, a mixing drum, a perforated partition positioned transversely within the drum, means for forcing the material through said perforated partition, means for mixing the material forced through the perforations, a delivery nozzle having an aperture of predetermined cross section, and means for forcing the mixed material through said aperture.

6. In apparatus for reclaiming scraps of manufactured roofing material, a mixing drum, means for applying heat to the scrap material in the drum, a perforated plate positioned transversely within the drum, means for forcing the scrap material through the perforations, means for mixing the material after its passage through the plate, a nozzle having an aperture of predetermined shape, means for extruding the mixed material through said aperture, means for conveying the extruded material from the mixing drum, and means for supplying a fabric strip on the conveyor to receive the extruded material.

7. In apparatus for reclaiming scraps of bitumen-impregnated fibrous roofing material, means for shredding the fibrous constituents of the scraps and arranging the shreds lengthwise in the same direction, means for chopping the shreds transversely into bits, and means for mixing the bits and the other constituents of the material into a plastic mass of uniform consistency; said reclaiming apparatus including means for heating said scraps.

8. In an apparatus for reclaiming scraps of bitumen-impregnated fibrous material, means for heating the scraps, means for shredding the fibrous constituents and arranging the shreds lengthwise in the same direction, means for chopping the shreds transversely into bits, means for mixing the bits and the other constituents of the material into a plastic mass of uniform consistency, and means for forming the material so treated into a continuous strip.

9. In apparatus for reclaiming scraps of manufactured roofing material, means for reducing the scraps to a plastic mass, said means comprising a mixing drum, means for applying heat thereto, a perforated plate removably positioned within said drum and transversely thereof, means for forcing the scrap material through said perforations, and means for mixing the material from the perforations; and means for extruding the mixed material from the drum in a continuous strip.

10. In apparatus for reclaiming scraps of manufactured roofing material, mechanism for reducing the scraps to a plastic mass comprising a mixing drum, a shaft extending longitudinally therethrough, a screw conveyor mounted on said shaft in one end portion of the drum, a perforated plate positioned transversely of the drum and adjacent an end of said screw conveyor, and a mixing device within the drum and beyond said plate, said mixing device comprising stator blades secured to the drum and rotor blades secured to the shaft.

11. In apparatus for reclaiming scraps of manufactured roofing material, means for reducing the scraps to a uniform strip, said means comprising a cylindrical mixing drum, means for applying heat thereto, a hopper at the receiving end of said drum, a nozzle at the delivery end of said drum, a shaft within the drum extending axially thereof, a screw conveyor mounted on said shaft at the receiving end of the drum, a perforated plate removably positioned transversely of the drum in the central portion thereof and abutting an end of said screw conveyor, a mixing device adjacent said plate comprising stator and rotor blades, and a second screw conveyor mounted on said shaft between said mixing device and said nozzle.

12. In apparatus for reclaiming scraps of manufactured roofing material, a mixing drum, a perforated partition positioned transversely within the drum, means for applying heat to the drum, means for forcing the material through said perforated partition, and means for stirring material forced through the perforations.

13. The process of reclaiming fibrous-bitumen-impregnated material, the steps which comprise, plasticizing said bitumen-impregnated material, homogenizing the plasticized material and thereafter extruding the thus plasticized and homogenized material into a sheet of predetermined cross section.

14. The process of treating fibrous bitumen-impregnated material, the steps which comprise progressively advancing the material to a zone wherein plasticizing takes place, in continuously leading the material to a zone where homogenization takes place and in thereafter continuously extruding the thus plasticized and homogenized material into sheets of predetermined cross section.

15. The process of reclaiming waste fibrous bitumen-impregnated material of a character having sufficient bitumen therein to enable it to be plasticized by heat, the steps which consist in introducing the said bitumen-impregnated fibrous material to a plasticizing zone, effecting a fine sub-division of said plasticized material and in thoroughly mixing the thus plasticized and finely divided mass.

16. The process of treating bitumen-impregnated fibrous material comprising plasticizing the material by heat, in thereafter effecting a fine sub-division of the material and homogenization thereof and in mixing the thus plasticized and homogenized mass.

17. The process of treating fibrous bitumen-impregnated material which comprises the steps of plasticizing the material by heat, in effecting the homogenization of the material in its thus plasticized condition and in thereafter forming articles of predetermined shape with the plasticized and homogenized mass.

18. In an apparatus for fabricating scraps of fibrous sheeted bituminous products, a mixing drum including means therein for finely dividing scraps of bituminous impregnated fibrous material and forming from said scraps a finely divided homogenous plastic mass, means communicating with said drum for extruding said plastic mass in lengths of predetermined cross section, and means for supplying a fibrous facing sheet to said length of extruded plastic materials as it leaves said extruding means.

19. In an apparatus for fabricating scraps of fibrous sheeted bituminous products, a mixing drum including means therein for finely subdividing scraps of bituminous impregnated fibrous material and forming from said scraps a finely divided homogenous plastic mass, means communicating with said drum for extruding said plastic mass in lengths of predetermined cross section, and means for supplying upper and lower facing sheets to said length of extruded plastic material as it leaves said extruding means.

20. In an apparatus for fabricating scraps of fibrous sheeted bituminous products, a mixing drum including means therein for finely subdividing scraps of bituminous impregnated fibrous material and forming from said scraps a finely divided homogenous plastic mass, means for maintaining the material heated while being subdivided into a plastic mass, means communicating with the said drum for extruding said plastic mass in lengths of predetermined cross section, and means for applying a fibrous facing sheet to said length of extruding plastic material as it leaves said extruding means.

21. A process of fabricating scraps of fibrous sheeted bituminous product consisting in subjecting the product to a mixing zone for effecting fine subdivision of the scraps of bituminous impregnated fibrous material and forming from said scraps a finely divided homogeneous plastic mass, extruding said plastic mass in lengths of predetermined cross section and applying a facing sheet to said length of extruded plastic material as it emerges from the extruding zone.

22. A process for reclaiming fibrous bitumen impregnated material comprising shredding the fibrous constituents, in finely dividing the shredded material and in thoroughly mixing the finely divided mass.

23. A process for reclaiming fibrous bitumen impregnated material comprising shredding the fibrous constituents, in finely dividing the shredded material, thoroughly mixing the finely divided mass and in extruding the mixed and finely divided mass.

24. A process for reclaiming fibrous bitumen impregnated material comprising the steps of continuously shredding the fibrous constituents, continuously subdividing the shredded material and in continuously mixing and extruding the finely divided mass.

25. A process for reclaiming fibrous bitumen impregnated material comprising shredding the fibrous constituents with the shreds arranged in the same direction, finely dividing the shredded material and thoroughly mixing the finely divided mass.

26. A process of reclaiming scraps of bitumen impregnated fibrous material comprising softening the scraps by heat, shredding the fibrous constituents, in finely subdividing the shredded constituents and mixing the finely divided bits.

27. The process of reclaiming scraps of manufactured roofing material comprising mixing the scraps into a plastic mass with the application of heat, extruding the mass to shred the fibrous constituents, in finely subdividing the shredded material, extruding the finely divided material so treated in a sheet of any desired cross section and rolling out the sheet.

28. In an apparatus for reclaiming scraps of bitumen impregnated fibrous material, means for shredding the fibrous constituents and means for finely subdividing the shreds into bits, and means for mixing the bits and the other constituents of the material into a plastic mass of uniform constituency.

29. The process of treating bituminous impregnated fibrous material which consists in progressively advancing said material to a disintegrating and mixing zone wherein the material is plasticized and homogenized.

30. The process of treating bitumen impregnated fibrous material comprising the steps of progressively advancing the material through a disintegrating and mixing zone, in controlling the temperature in said zone to maintain the disintegrated mass in a plastic condition and in continuously extruding the mass from said zone.

31. The process of treating fibrous bitumen impregnated material, the steps which comprise the progressive advancement of said material through a disintegrating and mixing zone, in progressively raising the temperature of the material as it passes through said zone to maintain the material in a plasticized condition and in continuously extruding the material from said zone.

32. A method of producing plastic material from waste products of the asphalt roofing industry which comprises subjecting the waste material to a succession of disintegrating operations and agitating and mixing the material underdoing the disintegrating operations.

In testimony whereof I have affixed my signature.

CHESTER R. MacDONALD.